US009749480B1

(12) United States Patent
Katano

(10) Patent No.: US 9,749,480 B1
(45) Date of Patent: Aug. 29, 2017

(54) METHOD THAT PERFORMS FROM SCANNING TO STORING SCAN DATA USING SCAN CLOUD TICKET

(71) Applicant: Kyocera Document Solutions Inc., Osaka (JP)

(72) Inventor: Seiichi Katano, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/086,093

(22) Filed: Mar. 31, 2016

(51) Int. Cl.
*G06F 3/02* (2006.01)
*H04N 1/00* (2006.01)

(52) U.S. Cl.
CPC ..... *H04N 1/00241* (2013.01); *H04N 1/00204* (2013.01); *H04N 1/00225* (2013.01); *H04N 1/00344* (2013.01); *H04N 2201/0039* (2013.01); *H04N 2201/0094* (2013.01)

(58) Field of Classification Search
CPC ............ G06F 17/30861; G06F 3/0485; G06F 3/1204; G06F 3/1228; G06F 3/1253; G06F 3/1271; G06F 3/1287; G06F 3/1288; H04M 1/274508; H04M 1/7253; H04M 2250/04; H04M 2250/06; H04N 1/00244; H04N 1/00411
USPC ................. 358/1.15; 455/41.2; 600/28, 544; 715/738
See application file for complete search history.

(56) References Cited

U.S. PATENT DOCUMENTS

| 8,516,088 | B2 | 8/2013 | Bae | |
|---|---|---|---|---|
| 9,311,038 | B2* | 4/2016 | Park | G06F 3/1288 |
| 2009/0100155 | A1 | 4/2009 | Lee | |
| 2009/0257078 | A1* | 10/2009 | Sawada | G06F 21/608 |
| | | | | 358/1.14 |
| 2010/0020353 | A1* | 1/2010 | Yamaguchi | H04N 1/00 |
| | | | | 358/1.15 |
| 2013/0080905 | A1* | 3/2013 | Park | H04N 1/00941 |
| | | | | 715/738 |
| 2013/0151515 | A1* | 6/2013 | Davis | G06Q 50/01 |
| | | | | 707/736 |
| 2013/0208303 | A1* | 8/2013 | Uchida | G06F 3/0482 |
| | | | | 358/1.15 |
| 2014/0214957 | A1* | 7/2014 | Taniguchi | H04L 67/306 |
| | | | | 709/204 |
| 2014/0293361 | A1 | 10/2014 | Mori et al. | |
| 2015/0092233 | A1* | 4/2015 | Park | G06F 3/1288 |
| | | | | 358/1.15 |

(Continued)

*Primary Examiner* — Negussie Worku
(74) *Attorney, Agent, or Firm* — James Judge

(57) ABSTRACT

An image scanning method includes: logging into a cloud server by a terminal to confirm login information based on the login; generating a scan cloud ticket as a data file including content of job for storing scan data into the cloud server using the confirmed login information; sending the scan cloud ticket from the terminal to the image scanning apparatus; receiving the scan cloud ticket and accepting an initiation operation for initiating the job in response to the receiving; performing, in the image scanning apparatus, in response to the accepting of the initiation operation, the image scanning to generate the scan data; obtaining, in the image scanning apparatus, the login information from the scan cloud ticket and logging into the cloud server by the image scanning apparatus using the obtained login information; and uploading the scan data from the image scanning apparatus to the cloud server.

19 Claims, 9 Drawing Sheets

(56) References Cited

U.S. PATENT DOCUMENTS

2015/0098109 A1\* 4/2015 Um ................. G06F 3/1253
                                                358/1.15
2016/0094756 A1\* 3/2016 Onishi ............... H04N 1/442
                                                358/1.13
2017/0032114 A1\* 2/2017 Turgeman ........... G06F 21/32

\* cited by examiner

METHOD THAT PERFORMS FROM SCANNING TO STORING SCAN DATA USING SCAN CLOUD TICKET

BACKGROUND

Unless otherwise indicated herein, the description in this section is not prior art to the claims in this application and is not admitted to be prior art by inclusion in this section.

For an image forming apparatus (for example, printer, multifunction printer, or multi-functional peripheral), a function that transmits obtained scan data to a storage region connected to a network has been proposed. Specifically, for example, when handling scan data received in a fax, a technique that easily performs setting to sort the received scan data so as to store into a plurality of folders has been proposed. On the other hand, the following technique has also been proposed; the technique that specifies destinations of such as facsimile, e-mail, and file transfer with reference to address book data and registers and obtains some attribute information of a plurality of users collectively in a short time in a method for transmitting various data to its destination.

However, the multifunctionality of the image forming apparatus has caused a problem of complicated operation of the image forming apparatus.

SUMMARY

An image scanning method according to one aspect of the disclosure includes: logging into a cloud server by a terminal to confirm login information based on the login; generating, in the terminal, a scan cloud ticket as a data file including content of a job for storing scan data, generated by an image scanning apparatus, into the cloud server using the confirmed login information; sending the scan cloud ticket from the terminal to the image scanning apparatus; receiving, in the image scanning apparatus, the scan cloud ticket and accepting an initiation operation for initiating the job in response to the receiving; performing, in the image scanning apparatus, an image scanning in response to the accepting of the initiation operation, so as to generate the scan data; obtaining, in the image scanning apparatus, the login information from the scan cloud ticket and logging into the cloud server by the image scanning apparatus using the obtained login information; and uploading the scan data from the image scanning apparatus to the cloud server.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
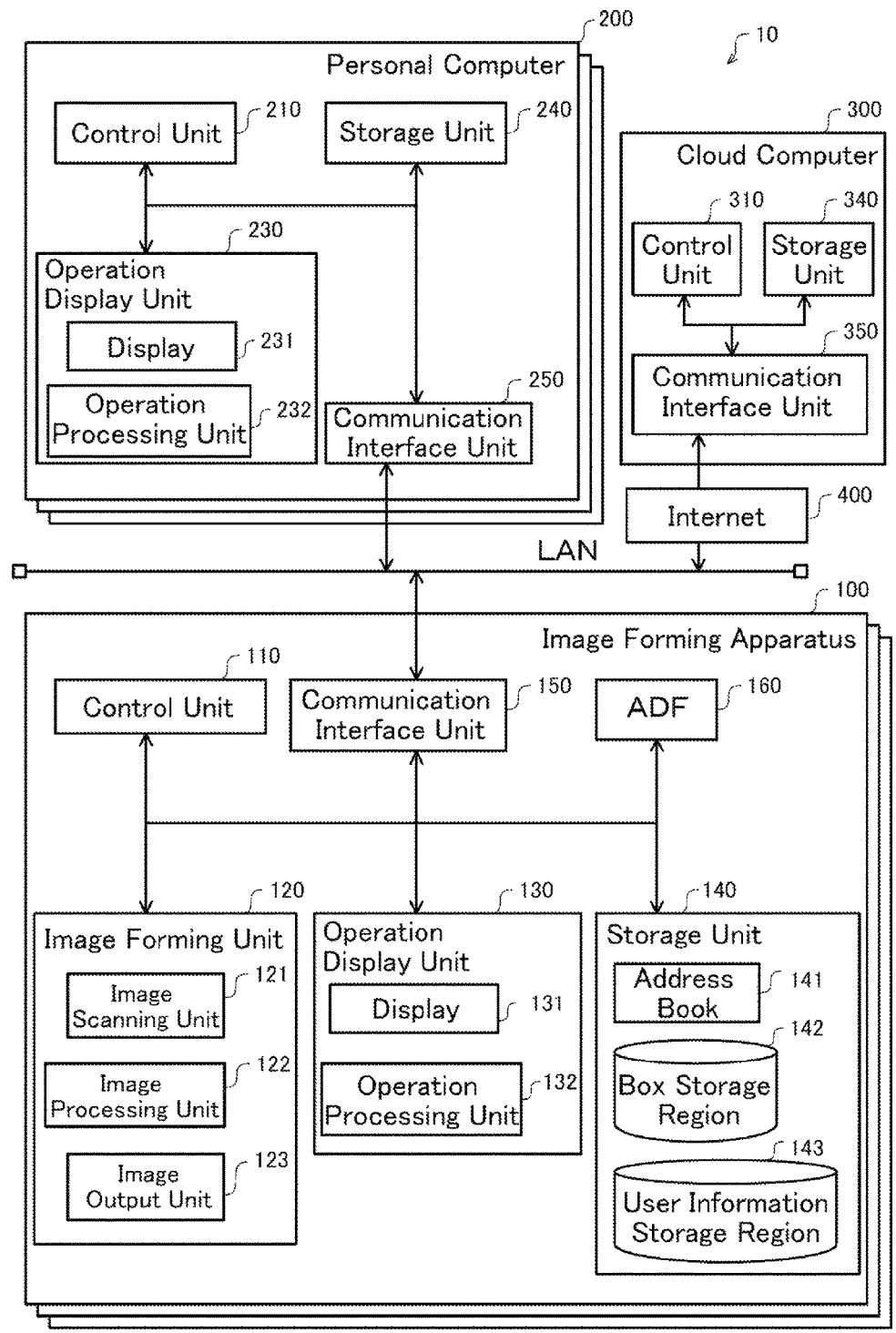
FIG. 1 illustrates a block diagram representing a functional configuration of an image forming system 10 according to the one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. Embodiment

The following describes embodiments of the disclosure (hereinafter referred to as, the "embodiments") with reference to the drawings.

FIG. 1 illustrates a block diagram representing a functional configuration of an image forming system 10 according to one embodiment of the disclosure. The image forming system 10 includes an image forming apparatus 100, a plurality of personal computers 200, and a cloud computer 300. The plurality of personal computers 200 are connected to the image forming apparatus 100 via a network (which is a LAN in this example). The cloud computer 300 is connected to the network via Internet 400. The image forming system 10 is configurable even if the number of the personal computer 200 is one.

The image forming apparatus 100 includes a control unit 110, an image forming unit 120, an operation display unit 130, a storage unit 140, a communication interface unit 150, and an automatic document feeder (ADF) 160. The personal computer 200 includes a control unit 210, an operation display unit 230, a storage unit 240, and a communication interface unit 250. The cloud computer 300 includes a control unit 310, a storage unit 340, and a communication interface unit 350.

The communication interface unit 150 and the communication interface unit 250 communicate using a transmission control protocol/Internet protocol (TCP/IP) suite.

The image forming unit 120 includes an image scanning unit 121, an image processing unit 122, and an image output unit 123. The image scanning unit 121 reads an image from a document to generate scan data. The image processing unit 122 processes the scan data in accordance with a print setting. The image output unit 123 prints on a printing medium based on the processed scan data.

The operation display unit 130 of the image forming apparatus 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an operation input of a user from the display 131, which functions as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also include a controller function related to an interface such as various kinds of I/Os, a universal serial bus (USB), a bus, and other hardware, and control the entire image forming apparatus 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively. The storage unit 140 further includes an address book 141, a box storage region 142, and a user information storage region 143. A storage region available for each user of the image forming apparatus 100 is allocated in the box storage region 142. The user information storage region 143 stores personal information, such a password for authentication of each user, associated with the user recorded in the address book 141.

The user of the personal computer 200 has a login account in the cloud computer 300. This user can log into the cloud computer 300 to use the storage unit 340 as a data storage region.

Figure 2:
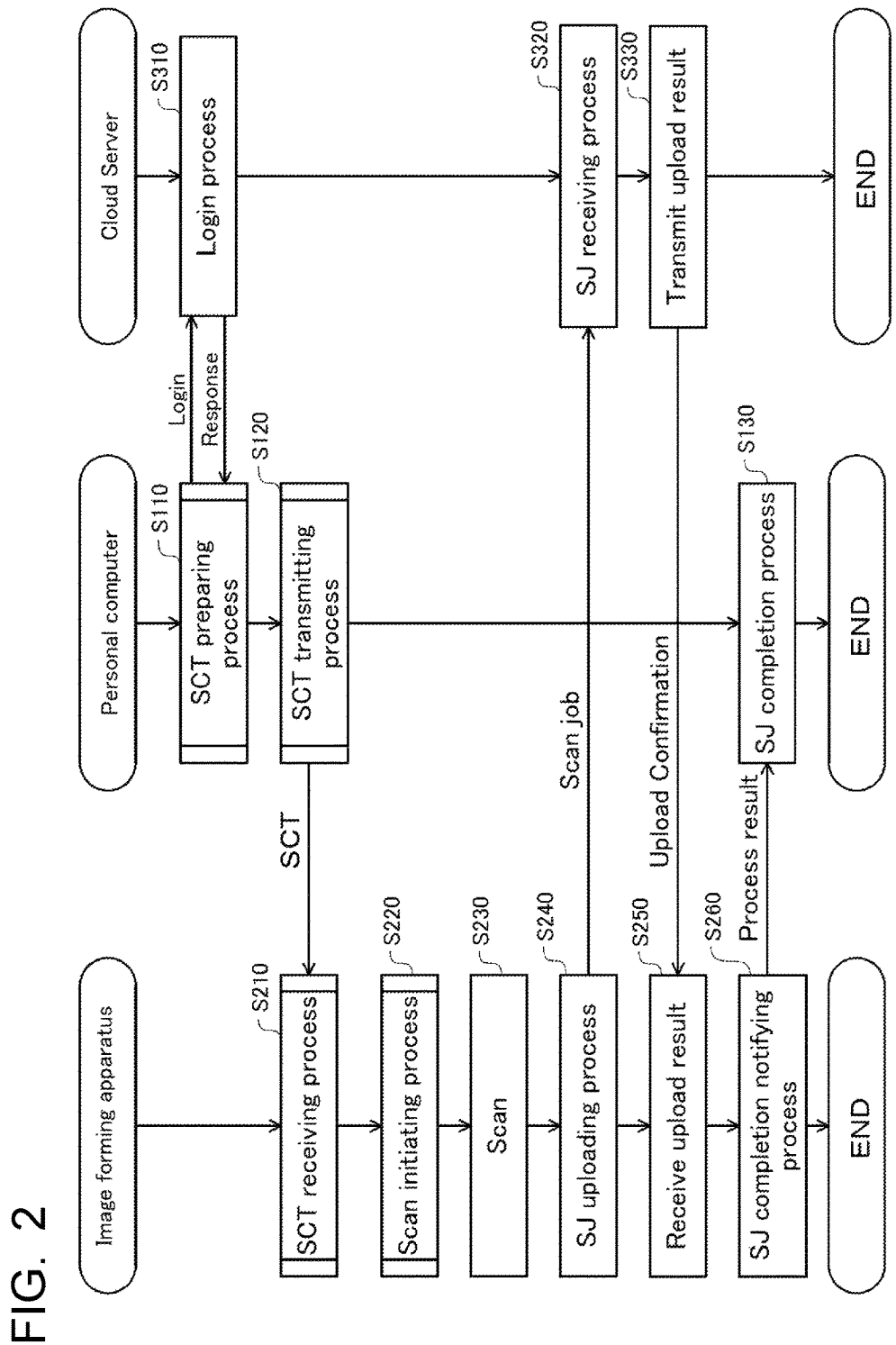
FIG. 2 illustrates a flow chart representing a content of a scan data storing process according to the one embodiment.

FIG. 2 illustrates a flow chart representing a content of a scan data storing process according to the one embodiment. This embodiment is described as one example of a client application, which operates on Windows (registered trademark) platform. The client application achieves the scan data storing process using a protocol supported by cloud computer 300, such as hypertext transfer protocol (HTTP), hypertext transfer protocol secure (HTTPS), or a file transfer protocol (FTP).

The application programs are stored in the storage units 140, 240 and 340, and performed by the control units 110, 210 and 310, respectively. The image forming apparatus 100, the personal computer 200, and the cloud computer 300 operate in a peer-to-peer method as follows based on any of protocols including the above-described protocols.

At Step S110, a user performs an SCT preparing process on the personal computer 200. The SCT preparing process is a process that prepares a scan cloud ticket (SCT). The scan cloud ticket is a ticket as a data file for performing a job that stores scan data scanned and generated by the image forming apparatus 100 in the predetermined folder of the storage unit 340 included in the cloud computer 300.

Figure 3:
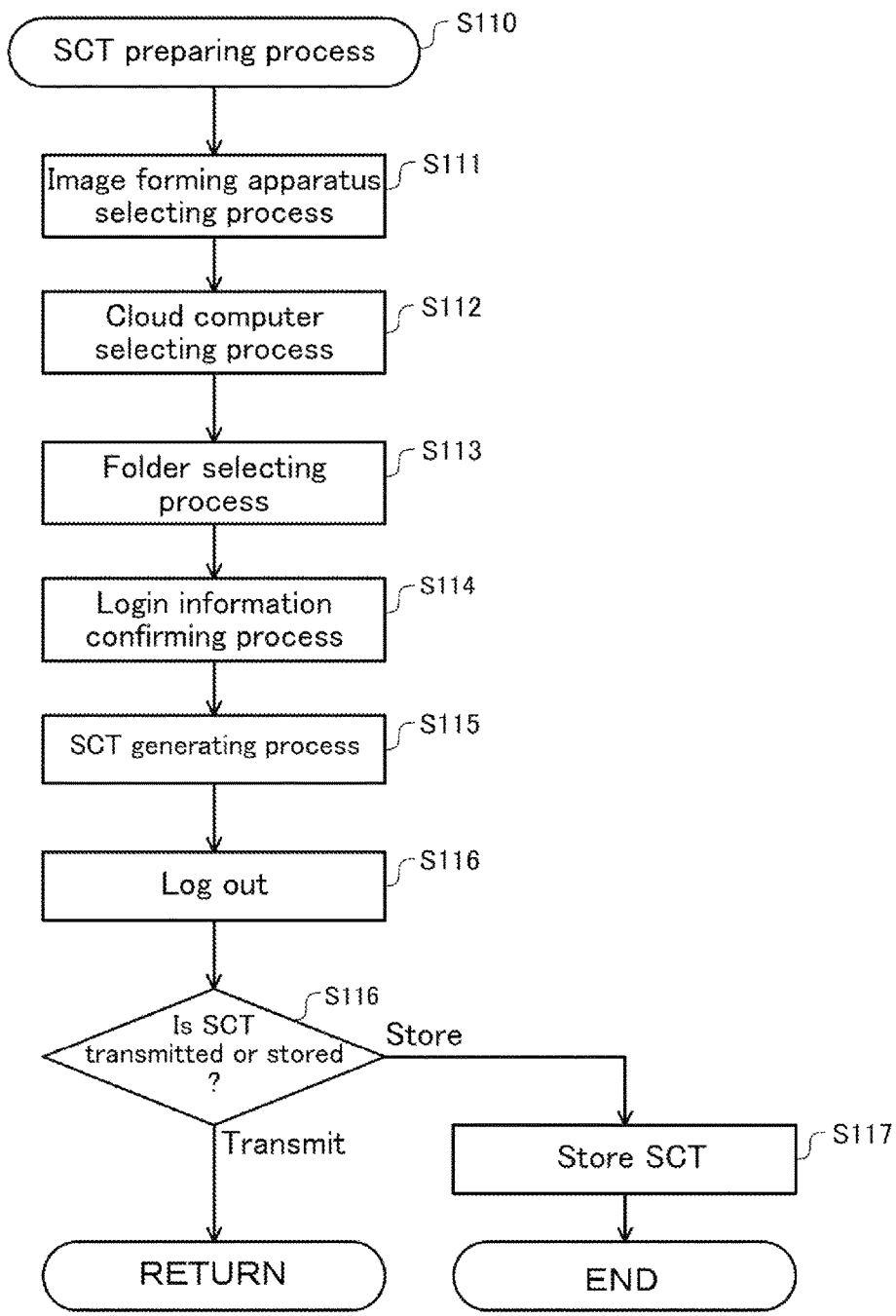
FIG. 3 illustrates a flow chart representing a content of a scan cloud ticket (SCT) preparing process according to the one embodiment.
Figure 4:
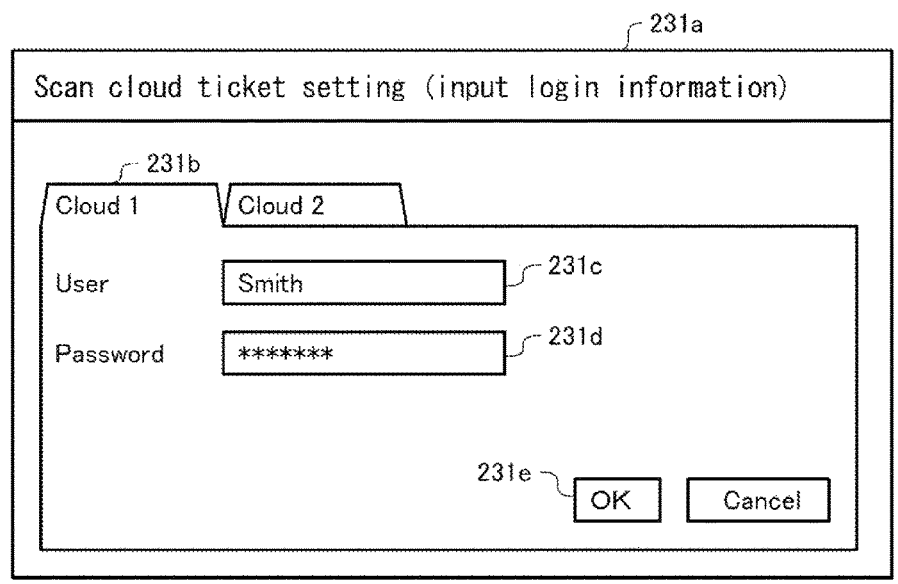
FIG. 4 illustrates an explanatory view representing user interface screens for use at the SCT preparing process according to the one embodiment.
Figure 4:
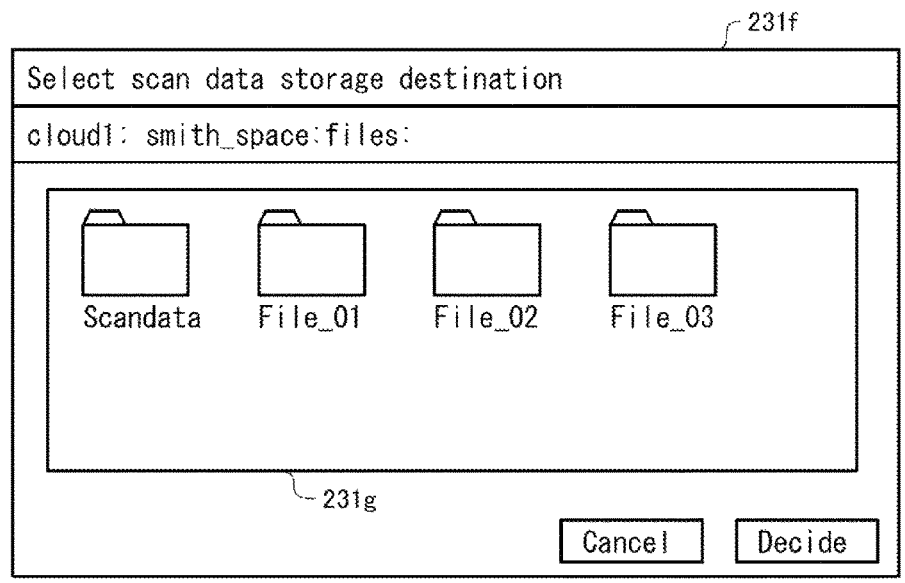

FIG. 3 illustrates a flow chart representing a content of the SCT preparing process according to the one embodiment. FIG. 4 illustrates an explanatory view representing user interface screens for use at the SCT preparing process according to the one embodiment. The SCT preparing process starts by initiating an application for the SCT process (not illustrated) on the personal computer 200.

At Step S111, the control unit 210 performs an image forming apparatus selecting process. The image forming apparatus selecting process is a process for selecting the image forming apparatus 100 for scanning. The control unit 210 displays a screen (not illustrated) for selecting the image forming apparatus 100 so as to ensure a selection by a user. The selection of the image forming apparatus can be performed in various ways such as a selection using an IP address, a selection by a Web services for devices (WSD) setting, and a selection by a name of the image forming apparatus.

At Step S112, the control unit 210 performs a cloud computer selecting process. The cloud computer selecting process is a process for selecting a cloud computer to store the scan data. The control unit 210 causes the display 231 to display a login screen 231a (see FIG. 4). The login screen 231a is a screen for selecting and logging into the cloud computer. The user, on the login screen 231a, selects a cloud computer to store the scan data from available cloud 1 (cloud computer 300) and cloud 2. In this example, the user clicks a tab 231b to select the cloud 1.

The user inputs login information (user name and password) for login to a user name field 231c and a password field 231d, and then touches an OK icon 231e to log into the cloud computer 300. The cloud computer 300 performs the login process. The login process is a process for confirming that a user attempting the login is a preliminarily authorized user based on the received login information and allowing the authorized user to log into the cloud computer 300 (Step S310).

At Step S113, the control unit 210 performs a folder selecting process. The folder selecting process is a process for selecting a folder to store the scan data. The control unit 210 causes the display 231 to display a folder selection screen 231f, which is a user interface screen for selecting a folder. In this example, a Scandata folder in a window 231g of the folder selection screen 231f is selected. The control unit 210 obtains a path to the Scandata folder.

At step S114, the control unit 210 performs a login information confirming process. The login information confirming process is a process to confirm that the login information ensures the login available information, based on a login normal completion at step S112. Furthermore, the control unit 210 requires a permission of a double login from the selected image forming apparatus 100, only within a time preliminarily set, of the cloud computer 300. In this example, the cloud computer 300 basically inhibits the double login.

At Step S115, the control unit 210 performs the SCT generating process. The SCT generating process is a process for generating the scan cloud ticket. The scan cloud ticket may be constituted, for example, as a simple object access protocol (SOAP) message. The SOAP message of the scan cloud ticket is a data file that has a SOAP envelope including a SOAP main body.

The SOAP main body includes a virtual host name (which is cloud_1 in this example) of the inside of the cloud computer 300, the path to the Scandata folder (smith_space: files: Scandata in this example), the selected image forming apparatus 100, login information (login has been confirmed), a validity period Pv, information representing various kinds of settings when scanning, and user information. The various kinds of settings for scanning include settings such as a color/monochrome selection, a resolution setting, and a data type (JPEG, PDF, or a similar format) selection. The user information is information that has been recorded in an address book 141 of the image forming apparatus 100. This information is received on a user interface screen (not illustrated).

The validity period Pv, which is also referred to as validity period information, for example, may be set as follows.

(1) A date and time range setting is a method for setting date and time of a commencement and a termination of the validity period Pv. Specifically, the date and time range setting is, for example, a setting that the commencement is 1:00 P.M. Oct. 10, 2015 and the termination is 5:00 P.M. on the same day.

(2) A time limit setting is a method for setting a time limit from the commencement of the validity period Pv. Specifically, the time limit setting is, for example, a setting that the time limit is 30 minutes, being reckoned from an SCT receiving completion time t1 (described below) by the image forming apparatus 100 as the commencement. This example will be described as the validity period Pv is a time limit setting as the time limit of 30 minutes.

At Step S116, the personal computer 200 logs out of the cloud computer 300. At Step S117, the control unit 210 can transmit or store the scan cloud ticket (Step S118) corresponding to a selection by a user. A transmission destination of the scan cloud ticket is, in this embodiment, the image forming apparatus 100. A user can read the stored scan cloud ticket so as to use any time.

At Step S120 (see FIG. 2), the control unit 210 performs an SCT transmitting process. The SCT transmitting process is a process where the personal computer 200 transmits the scan cloud ticket to the image forming apparatus 100 so as to confirm that the image forming apparatus 100 receives the scan cloud ticket. Thus, the control unit 210 and the communication interface unit 250 function as a scan cloud ticket transmitter.

Figure 5:
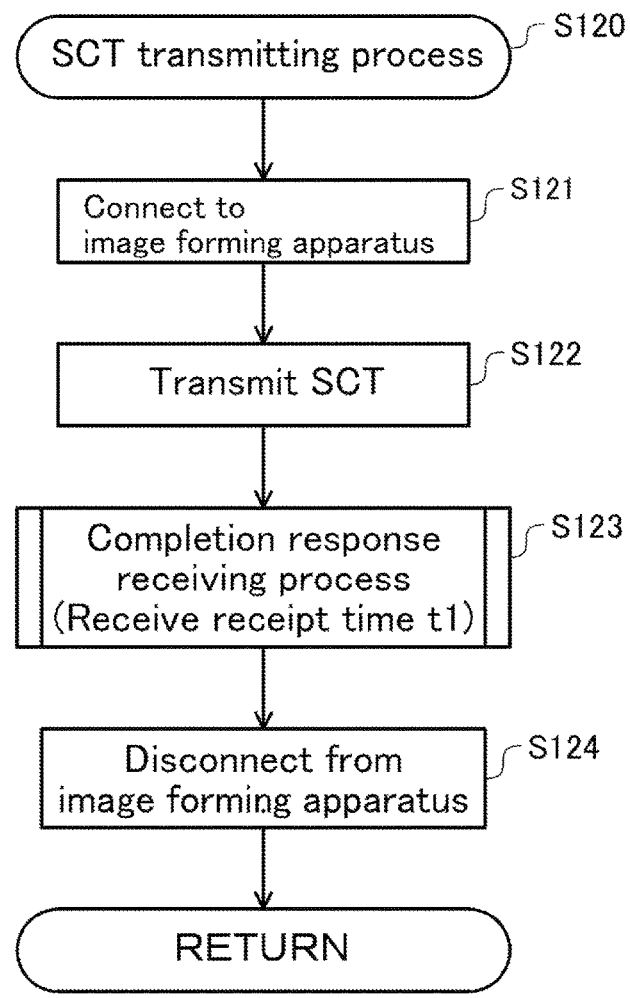
FIG. 5 illustrates a flow chart representing a content of an SCT transmitting process according to the one embodiment.

FIG. 5 illustrates a flow chart representing a content of the SCT transmitting process according to the one embodiment. At Step S121, the control unit 210 connects to the image forming apparatus 100, which is selected at Step S111, using the communication interface unit 250. At Step S122, the personal computer 200 transmits the scan cloud ticket configured as the SOAP message to the image forming apparatus 100.

At Step S123, the personal computer 200 performs a completion response receiving process from the image forming apparatus 100. The personal computer 200 receives a communication that the image forming apparatus 100 has completed a receipt of the scan cloud ticket. The completion response receiving process is a process performed in response to this receiving. At Step S124, the personal computer 200 disconnects the communication with the image forming apparatus 100 in response to this receiving of a receipt completion response. The details of a content of the completion response receiving process will be described later.

Figure 6:
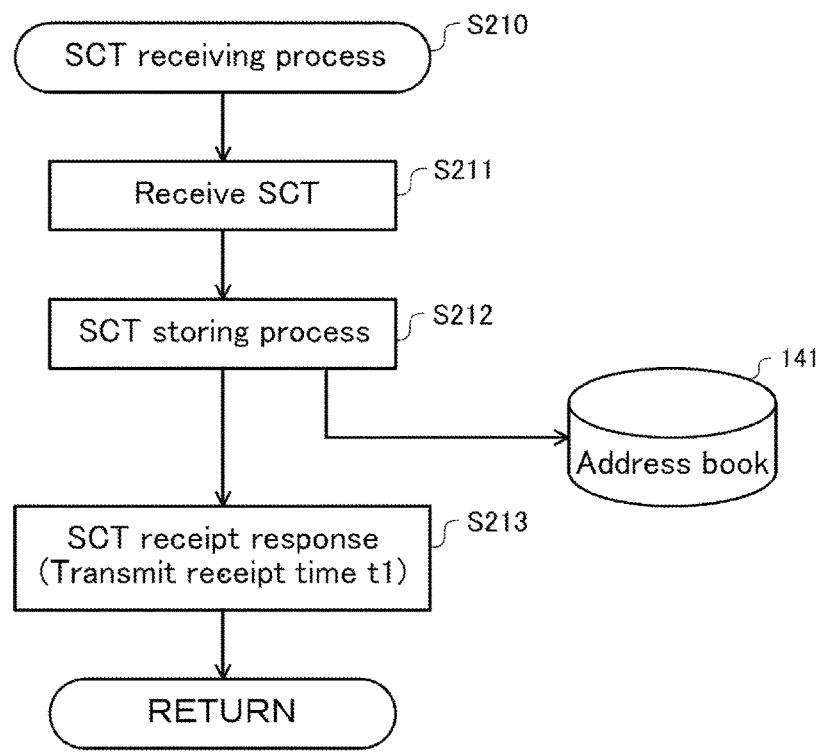
FIG. 6 illustrates a flow chart representing a content of an SCT receiving process according to the one embodiment.

FIG. 6 illustrates a flow chart representing a content of an SCT receiving process according to the one embodiment. At Step S210, the control unit 110 performs the SCT receiving process using the communication interface unit 150. The SCT receiving process, which is concurrently and simultaneously performed with the SCT transmitting process, is a process where the image forming apparatus 100 receives the scan cloud ticket (SCT) to become ready to accept a receipt by a user. Thus, the control unit 110 and the communication interface unit 150 function as a scan cloud ticket receiver.

At Step S211, the image forming apparatus 100 receives the scan cloud ticket (SCT). At Step S212, the control unit 110 performs an SCT storing process. The SCT storing process is a process for confirming that the scan job is a scan job from a user recorded in the address book 141 using user information included in the scan cloud ticket, then storing the scan cloud ticket. The storing of the scan cloud ticket is, for example, a process for storing the scan job ticket in the storage unit 140 while associating the scan job ticket with user information recorded in the address book 141 or data inside or outside the image forming apparatus 100 such as an external user management database.

At Step S213, the control unit 110 performs an SCT receipt response process. The SCT receipt response process is a process for returning information that the scan cloud ticket is received on the image forming apparatus 100 with the validity period information representing the receipt time t1 to the personal computer 200. The personal computer 200 performs the completion response receiving process (Step S123) in response to the SCT receipt response process.

Figure 7:
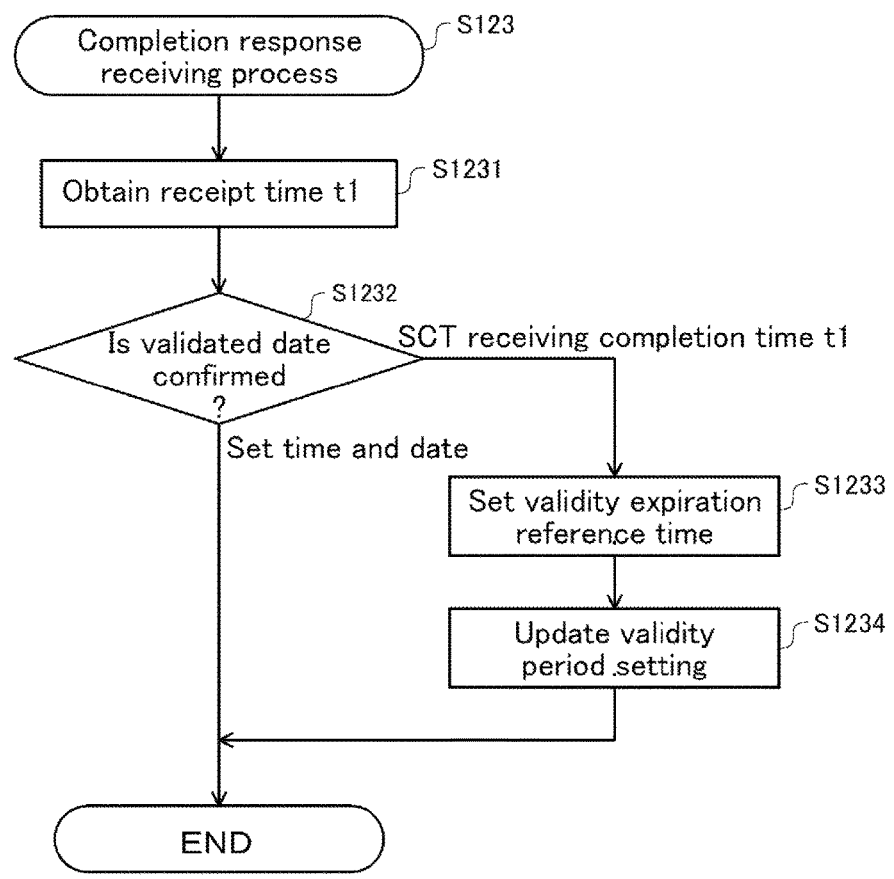
FIG. 7 illustrates a flow chart representing a content of a completion response receiving process according to the one embodiment.

FIG. 7 illustrates a flow chart representing a content of the completion response receiving process according to the one embodiment. At Step S1231, the personal computer 200 obtains the receipt time t1 from a communication message (for example, SOAP message) by the SCT receipt response process from the image forming apparatus 100. The receipt time t1 is also referred to as a SCT receiving completion time.

At Step S1232, the control unit 210 confirms a validity period. Specifically, the control unit 210 determines which setting is the validity period Pv included in the scan cloud ticket; the date and time range setting or the time limit setting. In the case of the date and time range setting, the process proceeds to Step S124 (see FIG. 5), and in the case of the time limit setting, the process proceeds to Step S1233. In this example, the validity period Pv is the time limit setting as the time limit of 30 minutes.

At Step S1233, the control unit 210 performs a validity expiration reference time setting process. The validity expiration reference time setting process, which is a process for setting a validity expiration reference time based on the scan cloud ticket, sets the validity expiration reference time to the SCT receiving completion time t1 as the commencement of the validity period. At Step S1234, the control unit 210 performs a validity period setting updating process. The validity period setting updating process is a process for updating the validity period of the scan cloud ticket, in this example, the validity period of the scan cloud ticket is 30 minutes from the SCT receiving completion time t1.

At Step S220 (see FIG. 2), the control unit 110 performs a scan initiating process. The scan initiating process is a process for initiating a scan operation in response to a user input to the image forming apparatus 100. The user receipt is also referred to as an initiation operation. The time of the user receipt is also referred to as a receipt time (time t2).

Figure 8:
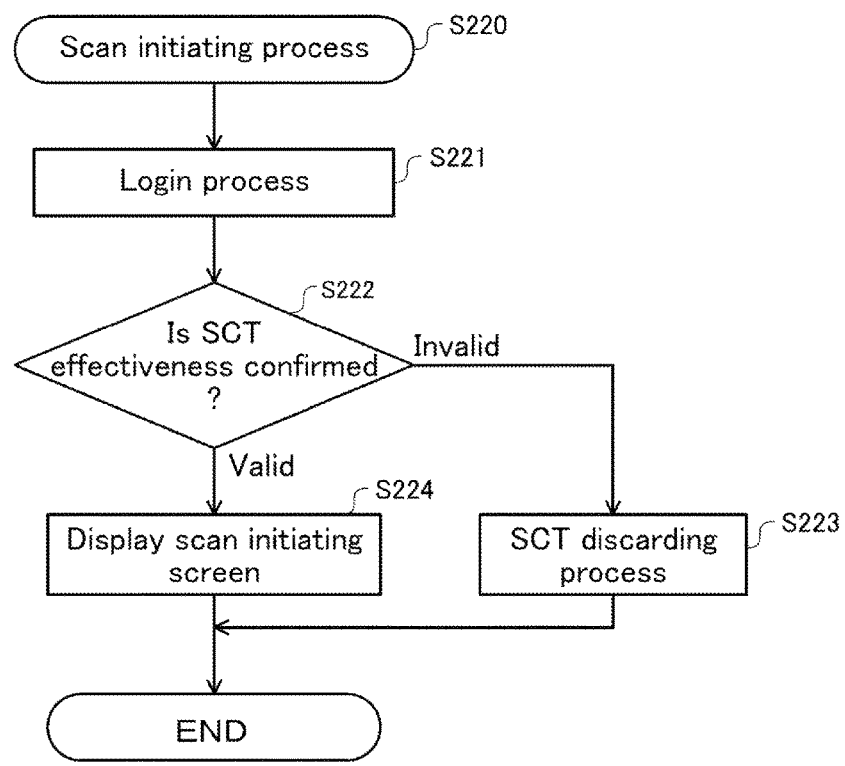
FIG. 8 illustrates a flow chart representing a content of a scan initiating process according to the one embodiment.

FIG. 8 illustrates a flow chart representing a content of the scan initiating process according to the one embodiment. At Step S221, a user logs in to the image forming apparatus 100. In response to the login, the control unit 110 reads out the scan cloud ticket associated with the user information of the user who has logged in recorded in the address book 141.

At Step S222, the control unit 110 confirms an effectiveness of the scan cloud ticket (SCT). The scan cloud ticket (SCT) effectiveness is, in this example, decided based on whether or not the SCT effectiveness is within the time limit preliminarily set from the SCT receiving completion time t1 (see Step S213) as described above. That is, the control unit 110 enables the scan cloud ticket if the time from the receipt completion of the scan cloud ticket to the user login time (time t2) is within the time limit. As the base point in time when determining whether or not the SCT effectiveness is within the time limit, an accept time of the initiation operation (Step S220) may be employed instead of the login time (time t2). The login time (time t2) is also a concept included in the accept time of the initiation operation.

Specifically, assuming that the SCT receiving completion time t1 is 3:15 P.M. on Oct. 10, 2015 and the time preliminary set is 30 minutes, the login until 3:45 P.M. on 10 Oct. 2015 is decided to be valid. On the other hand, the login after 3:45 P.M. on Oct. 10, 2015 is decided to be invalid and the scan cloud ticket is discarded (Step S223).

Figure 9:
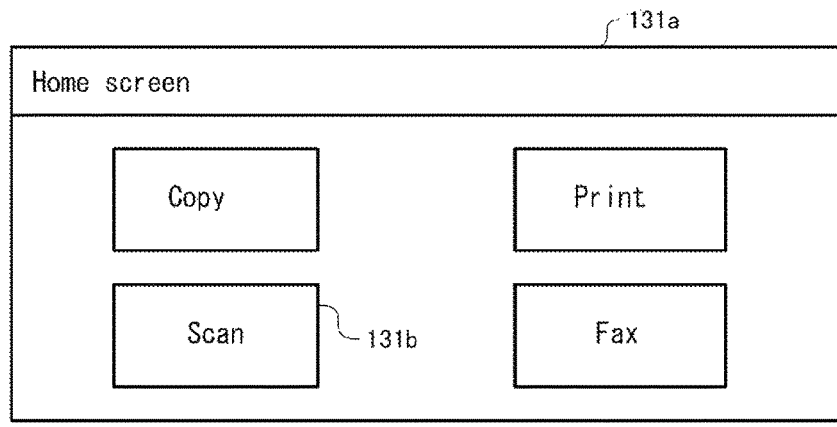
FIG. 9 illustrates an explanatory view representing user interface screens for use at the scan initiating process according to the one embodiment.
Figure 9:
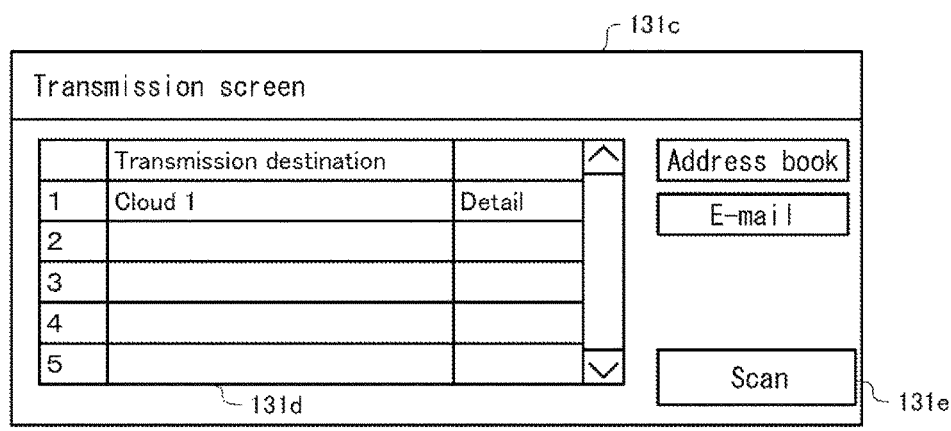
Figure 9:
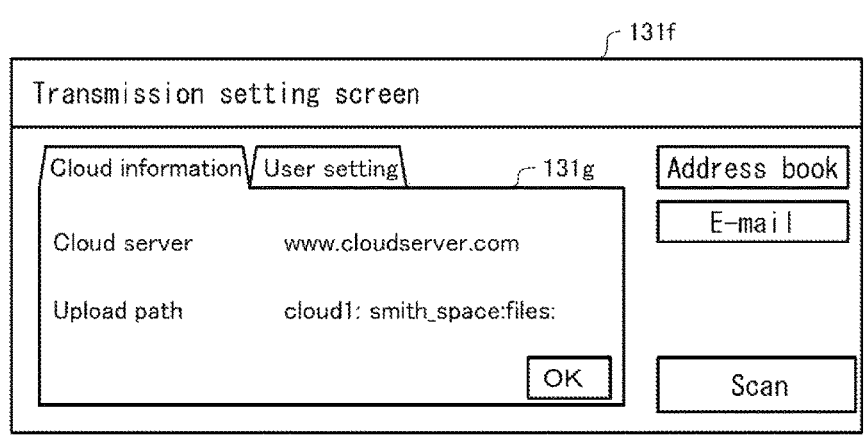

FIG. 9 is an explanatory view representing user interface screens 131a, 131c, and 131f for use at the scan initiating process according to the one embodiment. At step S224, the control unit 110 causes the display 131 to display a home screen 131a as an initial screen. On the home screen 131a, touching a scan function icon 131b ensures selection of a scan function. The control unit 110 causes the display 131 to display a transmission screen 131c in response to a scan function selection by the user.

The transmission screen 131c indicates that the cloud 1 is specified as an initial setting of a transmission destination on a transmission destination list 131d. If the user touches a text "Detail", the control unit 110 causes the display 131 to display a transmission setting screen 131f. This allow the user to confirm a cloud server and an upload path on a cloud information tab 131g.

The user can, for example, set a document in the ADF 160 and start scanning by touching a scan button 131e of the transmission screen 131c.

At Step S230 (see FIG. 2), the control unit 110 causes the image scanning unit 121 to scan to generate scan data. The scan is performed based on information representing various kinds of settings for scanning, which are included in the scan cloud ticket. The various kinds of settings include settings such as a color/monochrome selection, a resolution setting, and a data type (JPEG, PDF, or a similar format) selection. Thus, the control unit 110 and the image scanning unit 121 function as a scan data generator.

At Step S240, the control unit 110 logs into the cloud computer 300, and uploads the scan job, which includes the scan data, to the cloud computer 300. The login is performed using the login information obtained from the scan cloud ticket. Thus, the control unit 110 functions as a login processing unit and an upload processing unit.

At Step S320, the cloud computer 300 performs a scan job (SJ) receiving process. The SJ receiving process is a process for receiving the scan job and storing the scan data into the predetermined selected Scandata folder. This allows a user to store the desired scan data to the desired folder of the cloud computer 300.

At step S330, the cloud computer 300 transmits the result of the upload (for example, normal reception) to the image forming apparatus 100. The result of the upload includes a scan data URL (uniform resource locator). The scan data URL, which is basically set at steps S112 and S113, corresponds to the location displayed on the cloud information tab 131g.

At step S250, the image forming apparatus 100 receives the result of the upload. The image forming apparatus 100 performs a SJ completion process in response to the reception of the result of the upload. The SJ completion process is a process for returning a state of the cloud computer 300 such as the double login, which is required for the scan cloud ticket process, to the state before the scan cloud ticket process. The image forming apparatus 100 logs out of the cloud computer 300 after the SJ completion process.

This ensures that the image forming system 10 limit this state of the cloud computer 300 to the time required for the scan cloud ticket process. This can reduce management problems of the cloud computer 300 such as the double login.

The control unit 210, for example, even in the following cases, performs the SJ completion process and displays an error display (not illustrated) on the display 231.
(1) Abnormal termination of the SCT transmitting process (Step S120)
(2) Discard of the scan cloud ticket (Step S223)

At Step S260, the image forming apparatus 100 performs a scan job (SJ) completion notifying process. The SJ completion notifying process is a process for transmitting a notification, in which all the processes by the scan cloud ticket have been completed, and a scan data URL to the personal computer 200. The personal computer 200 performs a scan job (SJ) completion process (Step S130). The SJ completion process is a process for displaying the completion of the scan job and the URL of the scan data, thus notifying the user of them. This ensures a state where the personal computer 200 downloads scan data any time using the scan data URL.

The image forming apparatus 100 performs an SJ completion display. The SJ completion display is a process for displaying that all the processes by the scan cloud ticket have been completed on the display 131 of the image forming apparatus 100. This allows a user to leave from the image forming apparatus 100 after having confirmed that the scan data is stored in the Scandata folder of the cloud computer 300.

Accordingly, the image forming system 10 according to the one embodiment can achieve the sequence of jobs for scanning a document, generating scan data, and storing the scan data in the cloud computer 300, without performing a login operation from the image forming apparatus 100 to the cloud computer 300. This ensures the improved operability, which leads to the operational efficiency, of the image forming apparatus 100 while ensuring the image forming apparatus 100 to perform a complicated process.

B. Modification

The disclosure will not be limited to respective embodiments described above, but modifications as follows are also possible.

Modification 1

While in the above-described embodiment, the scan data URL is transmitted from the image forming apparatus 100 to the personal computer 200, the scan data URL is not necessarily to be transmitted via the image forming apparatus 100. The scan data URL may be, for example, transmitted from the cloud computer 300 to the personal computer 200 directly by e-mail. Furthermore, the scan data URL may be transmitted from both the image forming apparatus 100 and cloud computer 300 to the personal computer 200.

Modification 2

While in the above-described embodiment, the image forming system 10 is configured such that the double login is possible even in a state where the personal computer 200 has logged into the cloud computer 300, on the system where the double login is basically to be inhibited, the image forming system 10 is not limited to such configuration. Specifically, for example, at login to the cloud computer 300 by the image forming apparatus 100, the image forming system 10 may be configured such that the cloud computer 300 causes automatically (or forcibly) the personal computer 200 to log out.

Modification 3

While in the above-described embodiment, any authority confirmation is not performed to the process of the job by the scan cloud ticket, for example, information about whether or not to permit the process of the job by the scan cloud ticket may be recorded in an address book. This configuration allows only users recorded in the address book to perform the process of the job by the scan cloud ticket.

Modification 4

While in the above-described embodiment, the process of the job by the scan cloud ticket is executable in response to the login, the login function is not necessarily used. Alternatively, for example, a password may be required on the process of the job by the scan cloud ticket instead of employing login function.

Modification 5

While in the above-described embodiment, an image scanning system includes a personal computer and an image forming apparatus connected to the LAN, the image reading system does not necessarily include a personal computer and an image forming apparatus. Specifically, for example, an image scanning apparatus may be used instead of an image forming apparatus. Furthermore, the image scanning system may be configured by connecting a smart phone or a tablet, and the image forming apparatus with a wireless communication such as a Bluetooth (registered trademark). In this case, a user interface (initiation operation receiver) for initiating scan may be provided by any one of the smart phone or the tablet, and the image forming apparatus.

Modification 6

While in the above-described embodiment, the personal computer is employed, the disclosure is applicable to a portable terminal such as a notebook PC and a tablet as long as the portable terminal can communicate with the image forming apparatus. The communication includes a wired communication and a wireless communication.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In an image scanning system including a network-linked image scanning apparatus, personal computer, and cloud server, the image scanning apparatus including a user interface, and storage storing a user address book recording users of the image scanning apparatus and storing user-authentication information associated with the users recorded in the address book, the cloud server having cloud-server storage with folders for storing data from the image scanning apparatus, an image scanning method, comprising:

logging into the cloud server, through the personal computer, and based on the login, obtaining cloud-server login-confirmed information;

generating, in the personal computer, a data file as a scan cloud ticket for initiating a scan-data cloud-storage job, the scan cloud ticket including a path to a predetermined folder in the cloud-server storage, cloud-server login-confirmed information, scan-cloud ticket validity period information, and user-authentication information;

sending the scan cloud ticket from the personal computer to the image scanning apparatus;

receiving, in the image scanning apparatus, the scan cloud ticket;

using the user-authentication information in the scan cloud ticket, confirming that the scan-data cloud-storage job is from a user recorded in the address book, and user-associatively storing the confirmed scan cloud ticket in the image-scanning-apparatus storage;

carrying out a scan-cloud-ticket receipt response process of returning, to the personal computer, information indicating that the image scanning apparatus has received the scan cloud ticket, and indicating the time of receipt;

setting a validity expiration reference time, based on the validity period information in the scan cloud ticket, to the scan-cloud-ticket receipt time;

accepting, through user-interface input into the image scanning apparatus in response to the image scanning apparatus receiving the scan cloud ticket, an initiation operation for initiating the scan-data cloud-storage job, conditional on the user-interface input being within the validity period;

performing, in the image scanning apparatus, image scanning in response to the accepting of the initiation operation, so as to generate scan data;

obtaining, in the image scanning apparatus, the cloud-server login-confirmed information from the scan cloud ticket, and logging into the cloud server via the image scanning apparatus using the obtained cloud-server login-confirmed information; and uploading the scan data from the image scanning apparatus into the predetermined folder in the cloud-server storage.

2. The method according to claim 1, wherein the logging into the cloud server via the image scanning apparatus includes causing the cloud server to accept double login by the image scanning apparatus to the cloud server.

3. The method according to claim 2, further comprising limiting a period during which the cloud server accepts double login.

4. The method according to claim 2, wherein:

the logging into the cloud server via the image scanning apparatus includes configuring the cloud server for causing the personal computer to log out from the cloud server in response to a login request from the image scanning apparatus; and the cloud server causes the personal computer to log out from the cloud server, based on the configuration, in response to the login request from the image scanning apparatus.

5. The method according to claim 4, wherein the configuration includes limiting a period during which the cloud server accepts double login by the image scanning apparatus and causes the personal computer to log out from the cloud server.

6. The method according to claim 2, further comprising limiting a period during which the cloud server accepts double login by the image scanning apparatus and causes the personal computer to log out from the cloud server.

7. An image scanning apparatus enabled for cloud-server and personal-computer communications connection via a network, the image scanning apparatus comprising:

an image scanning unit;

a control processor;

an image-scanning-apparatus storage including a user address book recording users of the image scanning apparatus, and including a personal-information region storing user-authentication information associated with the users recorded in the address book;

a display including a user interface screen, and a user-input operation processor for accepting user-input operations through the user interface screen;

a communications interface connectable via the network to a personal computer, and to a cloud server having cloud-server storage with folders for storing data from the image scanning unit, the personal computer generating a data file as a scan cloud ticket for initiating a scan-data cloud-storage job, the scan cloud ticket including a path to a predetermined folder in the cloud-server storage, cloud-server login-confirmed information, and user-authentication information;

the control processor programmed to function, together with the communications interface, as a scan cloud ticket receiver configured to receive the scan cloud ticket;

the control processor programmed to function, together with the user interface screen, as an initiation operation receiver configured to accept an initiation operation for initiating the scan-data cloud-storage job in response to the receiving of the scan cloud ticket by the scan cloud ticket receiver;

the control processor further programmed to function, together with the image scanning unit, as a scan data generator configured to perform image scanning in response to the accepting of the initiation operation, so as to generate scan data;

the control processor further programmed to function as a login processing unit configured to obtain the cloud-server login-confirmed information from the scan cloud ticket and log into the cloud server using the obtained cloud-server login-confirmed information; and the control processor further programmed to function as an uploading unit configured to upload the scan data from the image scanning apparatus into the predetermined folder in the storage of the cloud server.

8. The apparatus according to claim 7, wherein the logging into the cloud server via the image scanning apparatus includes causing the cloud server to accept double login by the image scanning apparatus to the cloud server.

9. The apparatus according to claim 8, further comprising limiting a period during which the cloud server accepts double login.

10. The apparatus according to claim 8 wherein:

the logging into the cloud server via the image scanning apparatus includes configuring the cloud server for causing the personal computer to log out from the cloud server in response to a login request from the image scanning apparatus; and the cloud server causes the personal computer to log out from the cloud server, based on the configuration, in response to the login request from the image scanning apparatus.

11. The apparatus according to claim 10, wherein the configuration includes limiting a period during which the cloud server accepts double login by the image scanning apparatus and causes the personal computer to log out from the cloud server.

12. The apparatus according to claim 8, wherein the configuration includes limiting a period during which the cloud server accepts double login by the image scanning apparatus and causes the personal computer to log out from the cloud server.

13. An image scanning system, comprising:

a terminal;

a cloud server; and the image scanning apparatus according to claim 7; wherein the terminal includes a login information confirming unit configured to log into the cloud server and confirm the login information based on the login.

14. A non-transitory computer-readable recording medium storing an image scanning program for controlling an image scanning apparatus enabled for cloud-server and personal-computer communications connection via a network, the image scanning apparatus including an image scanning unit, a control processor, an image-scanning-apparatus storage including a user address book recording users of the image scanning apparatus, and including a personal-information region storing user-authentication information associated with the users recorded in the address book, a display including a user interface screen, and a user-input operation processor for accepting user-input operations through the user interface screen, and a communications interface connectable via the network to a personal computer, and to a cloud server having cloud-server storage with folders for storing data from the image scanning unit, the personal computer generating a data file as a scan cloud ticket for initiating a scan-data cloud-storage job, the scan cloud ticket including a path to a predetermined folder in the scan cloud storage, cloud-server login-confirmed information, and user-authentication information, the image scanning program causing the image-scanning-apparatus control processor to function;

together with the communications interface, as a scan cloud ticket receiver configured to receive the scan cloud ticket;

together with the user interface screen, as an initiation operation receiver configured to accept an initiation operation for initiating the scan-data cloud-storage job in response to the receiving of the scan cloud ticket by the scan cloud ticket receiver;

as a scan data generator configured to perform image scanning in response to the accepting of the initiation operation, so as to generate scan data;

as a login processing unit configured to obtain the cloud-server login-confirmed information from the scan cloud ticket and log into the cloud server using the obtained cloud-server login-confirmed information; and as an uploading unit configured to upload the scan data from the image scanning apparatus into the predetermined folder in the storage of the cloud server.

15. The recording medium according to claim 14, wherein the logging into the cloud server via the image scanning apparatus includes causing the cloud server to accept double login by the image scanning apparatus to the cloud server.

16. The recording medium according to claim 15, further comprising limiting a period during which the cloud server accepts double login.

17. The recording medium according to claim 15, wherein:

the logging into the cloud server via the image scanning apparatus includes configuring the cloud server for causing the personal computer to log out from the cloud server in response to a login request from the image scanning apparatus; and the cloud server causes the personal computer to log out from the cloud server, based on the configuration, in response to the login request from the image scanning apparatus.

18. The recording medium according to claim 17, wherein the configuration includes limiting a period during which the cloud server accepts double login by the image scanning apparatus and causes the personal computer to log out from the cloud server.

19. The recording medium according to claim 15, wherein the configuration includes limiting a period during which the cloud server accepts double login by the image scanning apparatus and causes the personal computer to log out from the cloud server.

* * * * *